Patented Mar. 5, 1929.

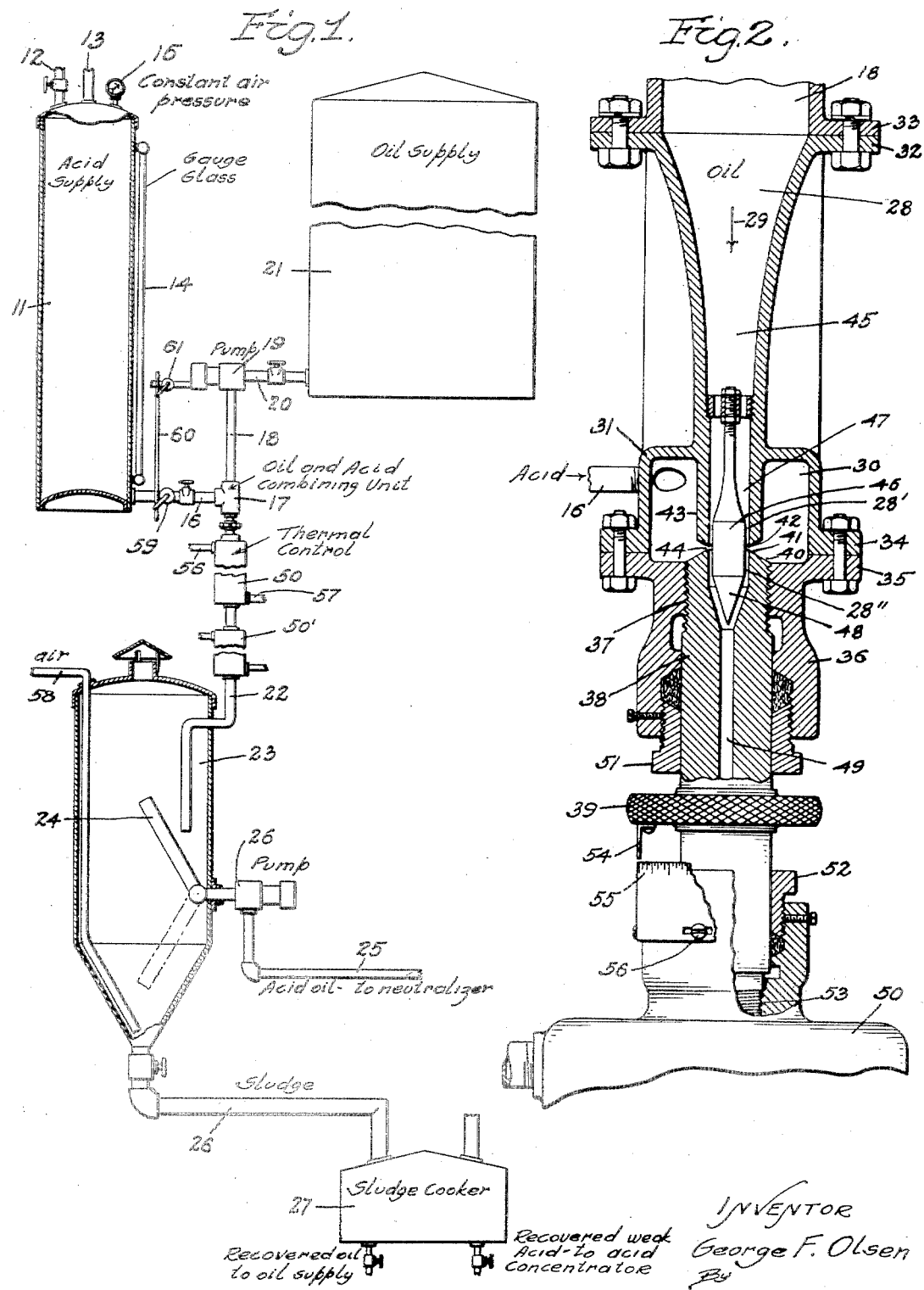

1,704,206

UNITED STATES PATENT OFFICE.

GEORGE F. OLSEN, OF LOS ANGELES, CALIFORNIA, ASSIGNOR TO GENERAL PETROLEUM CORPORATION OF CALIFORNIA, A CORPORATION OF DELAWARE.

ACID TREATMENT OF LUBRICATING OILS.

Application filed October 11, 1926. Serial No. 140,823.

It has heretofore been common, in adding sulphuric acid to lubricating oils, to add the acid in several batches, agitation being effected after each addition of acid by blowing with air. This method, although reasonably satisfactory in the case of a light oil, has several very serious disadvantages as applied in the treatment of the more viscous lubricants.

For example, the fresh sulphuric acid added in a second batch and the sludges formed by the first batch are mutually miscible or soluble. Thus, even though the settled sludge be withdrawn from beneath the body of oil, the oil will still contain "specks" of sludge, and the strength of the second batch of acid is adversely affected, and may be largely lost, by dilution with the previously formed sludge, and its reaction with said sludge may release therefrom sulpho-acids and color bodies which redissolve in the oil.

On subsequent neutralization these sulphoacids form troublesome soaps, soluble in both oil and water, so that the total process often results in a dark, unattractive and emulsifiable oil.

To obviate these disadvantages I add to each unit quantity of oil, at one time, sufficient acid to complete the treatment, and add the same in an attenuated state, thus getting extensive surfaces of contact and a corresponding promptitude of complete reaction without permitting acid to become dissolved or occluded within sludge particles.

It is an object of this invention to add acid in a thin film entering or initially surrounding streams or threads of oil, the acid remaining or promptly becoming finely intermixed with the oil during a turbulent advance thereof, this advance being so conducted that the sludge formed does not thereafter meet any free acid. The extension of the acid film provides a maximum surface of reaction, prevents the occlusion of free acid in the sludge, and insures a maximum rate of chemical action. My method avoids a re-solution of acid sludge, such as occurs when fresh acid is added to partially treated oil containing acid sludge, and thus results in a notable economy in acid. It also effects a substantial improvement in both the quality and the quantity of the treated oil produced.

Other objects of my invention, including (1) temperature control of the turbulent mixture of oil and acid during the reaction period, (2) a reduction in quantity of sludge, (3) a corresponding reduction in oil loss, (4) a decreased acid consumption, (5) a material improvement in color, (6) a saving in time, (7) facilitation of precise control, and (8) an assurance that every portion of the oil gets the same treatment—may be best appreciated from the following description of an illustrative embodiment of my invention, taken in connection with the appended claims and the accompanying drawings, in which Fig. 1 is a diagrammatic elevational view showing an apparatus suitable for the practice of my invention, parts being broken away, Fig. 2 is a longitudinal section through the combining unit indicated at 17 in Fig. 1, this unit being shown as associated with means for thermal control of the turbulent mixture delivered thereby.

Referring to Fig. 1, 11 is a tank for containing acid, fitted with 12—a valved acid-supply pipe, 13—a pipe for admitting air under constant pressure, 14—a gauge glass for observing contents of tank, 15—a pressure gage, and 16—a pipe for feeding acid to the combining unit 17.

21 is an oil supply tank feeding the pump 19 through the valved pipe 20, the pump in turn forcing oil through the pipe 18 into the combining unit 17.

59 is a control valve for acid in the line 16, and 61 is a control valve on the steam inlet to the pump 19. 60 is a link rod connecting these two valves by which means a parallel motion may be imparted to them and the feed of acid through valve 59 and the oil discharge through pump 19 be brought into some fixed relationship.

50 is a thermal control jacket surrounding the discharge of the combining unit 17. By admitting steam, hot or cold water through pipe 57, and venting it through pipe 56 the temperature of the mixture discharged by unit 17 may be brought to the most suitable temperature for completing the reaction of acid with oil. 50′ is a similar jacket in which cold water may be used for cooling the stream of mixture leaving the control means 50, the temperature of the mixture being thus reduced to a point where undesirable secondary reactions such as sulphonation will not take place.

From the cooler 50′ the mixture of oil and acid passes through pipe 22 into settling tank 23 where it separates into a layer of acid oil above and a layer of sludge below. The swing pipe 24 attached to the suction of the pump 26, is used for discharging this acid oil through the line 25 to a neutralizer or other desired point. The sludge accumulating in the bottom of tank 23 may be withdrawn as required through the valved pipe 26 into the sludge cooker 27 or elsewhere. The pipe 58 may be used for introducing compressed air into the bottom of tank 23 to promote the balling-up of acid sludge which for any reason refuses to settle from the oil.

Referring to Fig. 2 which represents the combining unit 17 on an enlarged scale, 31 is a main casting connected to the pipe 18 by means of the bolted flanges 32 and 33 and to the subcasting 36 by means of the bolted flanges 34 and 35. 37 indicates internal threads in the upper portion of the subcasting, these threads engaging external threads on the control member 38 which is rotated by the knurled wheel 39. This control member 38 is also threaded into the temperature control jacket 50 at the point indicated at 53. Packing glands of the usual type indicated at 51 and 52 are used to prevent leakage. The adjustment of the control member 38 may be indicated by the pointer 54 attached to the knurled wheel 39, which reads on a scale 55 held in place by the screws 56.

The upper portion of the main casting 31 is formed into a throat which, as indicated at 28 and 45, diminishes in diameter in the direction of flow indicated by the arrow 29. The oil delivered to this throat through the pipe 18 passes into the constriction 47 around the filler plug 46 thereby passing through the two alined annular channels 28' and 28''. Passing the tapered end 48 of the filler plug 46 the oil flows through the tubular constricted passage 49, and thence into the temperature control means 50.

The use of the filler plug 46 is optional and if it be omitted the oil takes a straight course through the channel 47 and is materially increased in velocity where it enters the smaller tubular channel 49.

In the main casting 31 an acid chamber 30 is formed around the constriction 47 of the oil channel; this chamber is fed with acid through the pipe 16. The lower end 43 of the throat is turned to a conical face as indicated at 42 opposed to which is a conical face 40 on the upper end of the control member 38. These two conical faces terminate in the circular edges 41 and 42 which may be advanced toward or retracted from each other by rotative adjustment of the control member 38. By drawing these edges out of contact a slot 43 is former through which acid may pass into the oil stream advancing from the throat 47 into the tubular channel 49. It will be seen that the width of this slot is under complete control and that a quantity of acid varying upward from the thinnest possible film may be admitted on the outside surface of the annular stream of oil flowing past such slot, assuming the filler 46 to be in place, or of the cylindrical stream which passes through the throat when the filler is not used.

As will be evident from the proportions shown in the drawing, the stream of oil passing through the narrow annular space 28' when the filler is in place must be greatly accelerated in velocity, and this velocity may readily be so great that acid will be actually drawn on to the stream from the chamber 30 through the slot 44 by the well known venturi effect. In such case pressure in the chamber 30 may be greatly less than the pressure in the pipe 18, or may be even less than atmosphere. If, however, the filler plug 46 is omitted the back pressure, due to the constriction 49, will set up an outward pressure on the slot 44 and in such case the pressure in the acid chamber 30 must be greater than the pressure in the oil pipe 18.

The use of the filler plug is particularly desirable in one respect, that it draws the oil down to an annular stream of relatively slight thickness, on the outside of which is placed by means of the slot 44 an annular layer of acid. A very close initial contact of acid with oil is thus produced and the possibility of the acid drawing into drops or globules, which would become coated with tar and cause the occlusion and loss of free acid, is thus positively prevented.

Further, the change of direction in the stream as it passes the tapering point 38 of the filler plug and changes from an annular to a cylindrical shape in the tubular constriction 49 sets up an intense turbulence which further promotes the subdivision of the acid in the oil. Under such conditions, the acid, being disseminated throughout the oil in an impalpable mist or cloud, a reaction which in contacting a mass of oil with a mass of acid in the usual manner would require an hour or even hours for completion, is actually completed in the fraction of a minute or second which is required for the travel of the mixture from the slot 44 through the temperature regulator 50.

If the filler plug 44 be omitted the stream of oil will be much greater in cross sectional area and will be cylindrical. The acid will therefore not be brought initially, at the slot 44, into so complete a mixture with the oil and the turbulence produced by the great increase in velocity incident to the entry of the mixture into the tubular constriction 49 is relied on to produce such degree of intermixture as is required to complete the reaction during the time which the oil takes to pass from the slot 44 through the temperature regulator 50 and into the short stop cooler 50'. The only end to be gained, therefore, by leaving out the filler plug is to prevent a possibilty (which is particularly imminent in the case of oils of high viscosity and such as are extremely reactive with acid) of producing so extremely close an admixture that the sludge cannot be separated from the treated oil on the completion of the reaction.

The reaction between sulfuric acid and the mixture of hydrocarbons making up a crude lubricating oil is not a single definite reaction but is an extremely complicated aggregation of overlapping reactions, some of which are desirable and some undesirable. The selection of operating conditions (speaking particularly of temperature and of time of contact) is always a compromise between the conditions which promote desirable reactions and those which promote undesirable reactions. To be more specific, the decolorizing effect of acid is increased both by increase of temperature and lengthening of contact time, but the undesirable reactions by which sulpho-acids are produced are also accelerated by the same factors. Further, time and elevation of temperature are to a considerable extent interchangeable factors, the reactions which take place rapidly at a high temperature taking place more slowly at a lower temperature but ultimately to the same end point.

By increasing to a very marked degree the subdivision of the acid in the oil the contact surface is so much increased that the decolorizing reactions, which take place at a low temperature, may be completed in a very short time, and thus it is possible to obtain a very high degre of decolorization from unit quantity of acid without raising the temperature or extending the contact time to a point where the sulphonating reaction commences.

If the oil and acid are intermixed in the discharge of the combining unit, heat is liberated by the exothermic reaction which immediately takes place. The temperature of the mixture leaving the combining unit will therefore be governed by the temperatures of the oil and the acid fed to the unit plus the increase due to reaction heat. This temperature may be too high to avoid the formation of sulphoacids if allowed to persist for any appreciable time, or on the other hand it may be too low for the completion of the reaction by which decolorization is effected. As this temperature is in the nature of the case practically out of operating control, the provision of the temperature regulator 50, by means of which the temperature of the mixture may be raised or lowered to exactly the point determined by experience to be most favorable, greatly increases the efficiency of the apparatus.

Again, the temperature most favorable to the completion of the decolorizing reaction may be higher than the temperature at which it is safe to discharge the oil into an accumulator such as that suggested at 23, in which a relatively large body of oil would lose its heat very slowly. Thus the time of reaction at elevated temperature might be so prolonged as to cause a serious degree of sulphonation. By passing a regulated quantity of cold water through the second temperature control suggested at 50', the temperature of the mixture may be brought down to that particular point at which the danger of sulphonation will cease and the oil will still remain sufficiently fluid to separate from the sludge formed during the reaction.

I claim as my invention:

1. In the treatment of lubricating oils with acid, the following method steps in the order stated: producing a confined annular stream of oil advanced at a velocity sufficient to produce turbulence therein, introducing onto the outer surface of said stream an annular stream of acid, and converting the combined annular stream into a confined cylindrical stream advanced at a velocity not less than the velocity of the annular oil stream.

2. In the treatment of lubricating oils with acid, the following method steps in the order stated: producing a confined stream of oil, introducing onto the outer surface of said stream an annular stream of acid, and reducing the cross-sectional area of the combined stream to increase its velocity to a point producing turbulence therein.

3. In the treatment of lubricating oils with acid, the following method steps in the order stated: producing a confined stream of oil, introducing onto the outer surface of said stream an annular stream of acid, advancing the combined confined stream at a velocity sufficient to produce turbulence therein, and continuously altering the temperature of said combined stream to a temperature favorable to decolorization and unfavorable to sulfonation of oil by acid.

4. In the treatment of lubricating oils with acid, the following method steps in the order stated: producing a confined stream of oil, introducing onto the outer surface of said stream an annular stream of acid, advancing the combined confined stream at a velocity sufficient to produce turbulence therein, continuously altering the temperature of said combined stream to a temperature favorable to decolorization and unfavorable to sulfonation of oil by acid, and continuously cooling said combined stream to avoid sulfonation of oil by acid.

5. In the treatment of lubricating oils with acid, the following method steps in the order stated: producing a confined stream of oil, introducing onto the outer surface of said stream an annular stream of acid, producing intermixture of the two streams, heating the combined stream to accelerate reaction between oil and acid, and cooling said combined stream to avoid sulfonation of oil by acid.

In testimony whereof I have hereunto set my hand at Los Angeles, California, this 4th day of October, 1926.

GEORGE F. OLSEN.